Aug. 21, 1928.
R. E. MILLER
1,681,551
LEAKAGE TESTING DEVICE
Filed Sept. 30, 1927
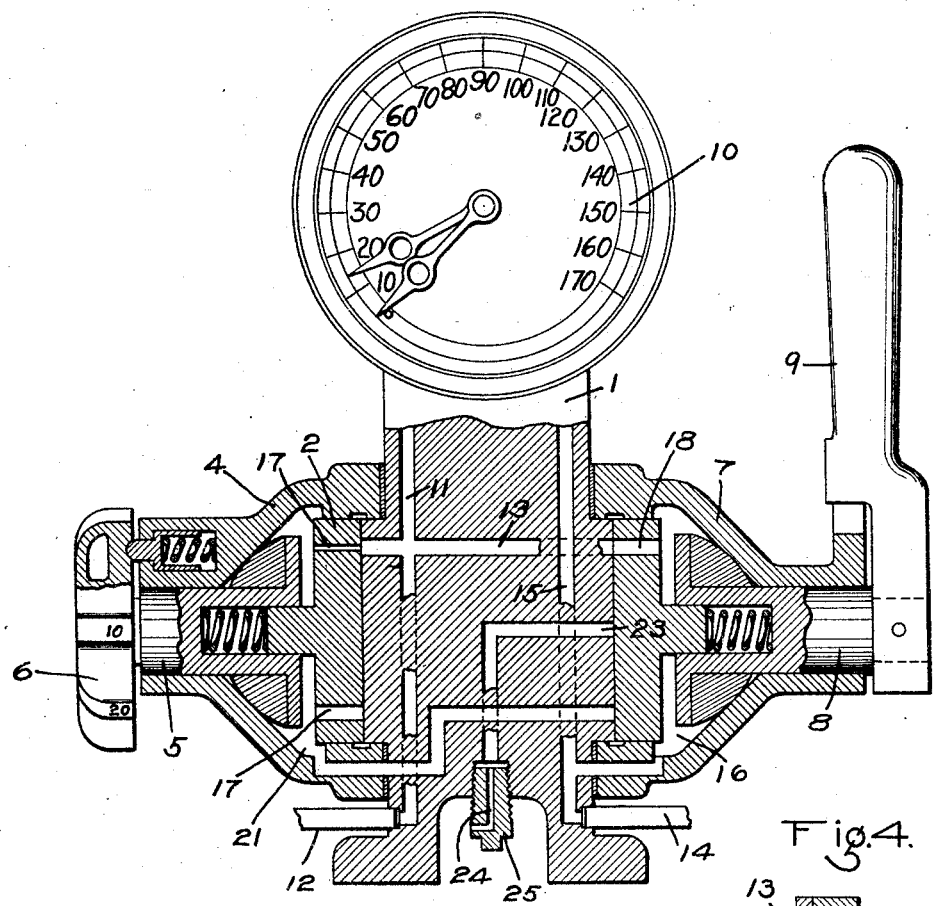
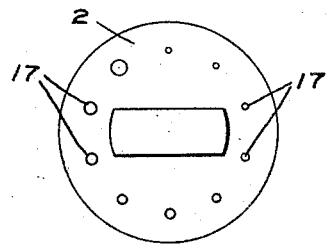
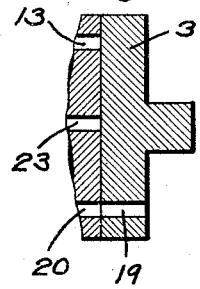
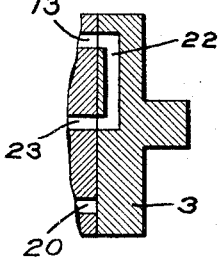
INVENTOR
RAYMOND E MILLER
BY
*Wm. N. Cady*
ATTORNEY Patented Aug. 21, 1928.

1,681,551

UNITED STATES PATENT OFFICE.

RAYMOND E. MILLER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

LEAKAGE-TESTING DEVICE.

Application filed September 30, 1927. Serial No. 222,998.

This invention relates to testing devices, and more particularly to means for testing the brakes on a train, before the train is run in service.

The principal object of my invention is to provide a portable device for testing the brakes on a railway train and for determining the extent of brake pipe leakage.

In the accompanying drawing, Fig. 1 is a sectional view of a testing device embodying my invention; Fig. 2 a plan view of one of the rotary valves employed in the testing device; Fig. 3 a sectional view of the other rotary valve employed in the testing device, showing the valve in its slow charging position; and Fig. 4 a view similar to Fig. 3, showing the rotary valve in its brake application position.

As shown in Fig. 1, the testing device may comprise a main casting 1 having a valve seat for a rotary valve 2 and a valve seat for a rotary valve 3. The valve 2 is enclosed by a cap 4 secured to the casting 1 and is operatively connected to a stem 5 which extends through an opening in the cap 4 and is provided with a hand wheel 6. The valve 3 is enclosed by a cap 7, secured to the casting 1 and is operatively connected to a stem 8 which extends through an opening in the cap 7 and is provided with an operating handle 9.

A double pressure gage 10 is carried by the casting 1 and is adapted to indicate both the pressure in the brake pipe and the pressure of the fluid pressure supply. A passage 11 leads from pipe 12, which is adapted to be connected to the brake pipe, to the gage 10 and a passage 13 leads from passage 11 to the seats of both rotary valves 2 and 3. A fluid pressure supply pipe 14 is connected to a passage 15 leading to the gage 10 and also to the rotary valve chamber 16.

A plurality of ports 17 are provided in the rotary valve 2, which ports are adapted to register with passage 13, according to the position of the valve 2, the ports 17 being of different flow areas. The wheel 6 is preferably marked with numerals from 10 to 100, in multiples of 10 to indicate the number of cars in the train.

In operation, the pipe 12 is connected to the brake pipe of the train to be tested and the pipe 14 to a source of fluid pressure supply and the hand wheel is set for the number of cars in the train to be tested. For example, the hand wheel is shown in the drawing as set for a train of 10 cars, with the port 17 of the smallest flow area registering with the passage 13.

The rotary valve handle 9 is now turned to its quick charging position, as shown in Fig. 1 of the drawing, in which a port 18 of the rotary valve 3 registers with passage 13. Fluid under pressure from the supply pipe 14 as supplied to the rotary valve chamber 16 then flows through port 18 and passage 13 to passage 11 and through pipe 12 to the brake pipe of the train. When the brake pipe pressure has been increased to a predetermined degree, say 70 pounds, as indicated by the gage 10, the rotary valve 3 is moved by the handle 9 to its slow charging position, as indicated in Fig. 3. In this position, a through port 19 in the rotary valve 3 registers with a passage 20 leading to the valve chamber 21. Fluid under pressure is thus supplied from rotary valve chamber 16 to rotary valve chamber 21 and flows from valve chamber 21 through the port 17 which is now in registry with passage 13. Fluid under pressure is thus supplied to the brake pipe at a predetermined rate, and one hand of the gage 10 will indicate the pressure of fluid in passage 11 and the brake pipe, while the other hand of the gage will indicate the supply pressure. The pressure difference, as shown between the pointers of the gage, is a measure of the extent of brake pipe leakage and knowing the pressure difference, the leakage can be determined by calculation, or by the use of previously calculated tables. If the brake pipe leakage be found excessive, the train may be inspected and the leaks stopped or leaky cars may be set out of the train. When the brake pipe leakage has been reduced to within the desired limits, this will be evidenced by the reduction in the pressure difference as indicated by the gage.

If the train is to be tested for defective brakes, the brake pipe is charged with fluid under pressure to the standard pressure to be carried in the train, by moving the rotary valve 3 to its quick charging position. The rotary valve 3 is then shifted to application position, as shown in Fig. 4, in which passage 13 is connected, through a cavity 22, to a passage 23, which is connected to the atmosphere, through a restricted port 24 in plug 25. Fluid is then vented from the brake pipe at a service rate, as determined by the port 24, and if any triple valve on a car of the train fails to respond to the reduction in brake pipe pressure, the car may be set out for repairs or the trouble may be overcome while the car remains in the train.

After the brakes of the train have been tested for applying, the brakes may be tested for releasing, by moving the rotary valve 3 to its slow charging position and then the cars are noted in which the brakes fail to release properly.

I have thus provided a portable testing device by which a train may be tested in the yard before the locomotive is attached and assurance will be had that the brakes on the train will apply and release properly and that the leakage from the brake pipe is not excessive.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. A brake testing device for testing the leakage of fluid from the brake system of a train comprising a brake pipe and a valve having a plurality of ports through one of which fluid under pressure is supplied to the brake pipe at a rate corresponding with the length of the train.

2. A brake testing device for testing the leakage of fluid from the brake system of a train comprising a brake pipe and a valve having a plurality of ports and movable to different positions for charging the brake pipe with fluid under pressure through one of said ports, which port is adapted to supply fluid at a rate corresponding with the length of train to be tested.

3. A brake testing device for testing the leakage of fluid from the brake system of a train comprising a brake pipe and a valve having a plurality of ports of different flow areas to correspond with different lengths of trains and a source of fluid under pressure, said valve being movable to different positions for supplying fluid from said source through one of said ports to the brake pipe.

4. The method of testing the fluid pressure brake system of a train for leakage which consists in supplying fluid under pressure from a source of fluid under pressure to the brake pipe through an opening of predetermined area and then calculating the leakage from the difference in pressure between the source of pressure and the pressure developed in the brake pipe as indicated by a pressure gage.

5. A device for testing the leakage of fluid from the fluid pressure brake system comprising a source of fluid under pressure, a valve having a port through which fluid under pressure is supplied from said source to the brake pipe, and a pressure gage for indicating the pressure developed in the brake pipe and also the pressure of said source.

6. A brake testing device comprising a member having connection to the brake pipe of a fluid pressure brake system and to a source of fluid under pressure, a rotary valve having a position for supplying fluid under pressure from said source through a port of predetermined area to the brake pipe, and a second rotary valve having a position for supplying fluid under pressure from said source to the first rotary valve.

7. A brake testing device comprising a member having connection to the brake pipe of a fluid pressure brake system and to a source of fluid under pressure, a rotary valve having a position for supplying fluid under pressure from said source through a port of predetermined area to the brake pipe, and a second rotary valve having one position for supplying fluid under pressure from said source to the first rotary valve and another position in which fluid under pressure is supplied directly to the brake pipe through a large port.

8. A brake testing device comprising a member having connection to the brake pipe of a fluid pressure brake system and to a source of fluid under pressure, a rotary valve having a position for supplying fluid under pressure from said source through a port of predetermined area to the brake pipe, and a second rotary valve having a position for supplying fluid from said source directly to the brake pipe, a position for venting fluid from the brake pipe, and a position for connecting said source of fluid under pressure to the first rotary valve.

9. The combination with the brake pipe of a fluid pressure valve system and a source of fluid under pressure, of a testing device comprising a valve having a plurality of ports of different flow areas, any one of which may be connected to supply fluid from said source to the brake pipe, a valve for connecting said source of fluid under pressure to the first valve, and a pressure gage for indicating the pressure of said source and also the pressure developed in the brake pipe.

In testimony whereof I have hereunto set my hand.

RAYMOND E. MILLER.